Figure 1:
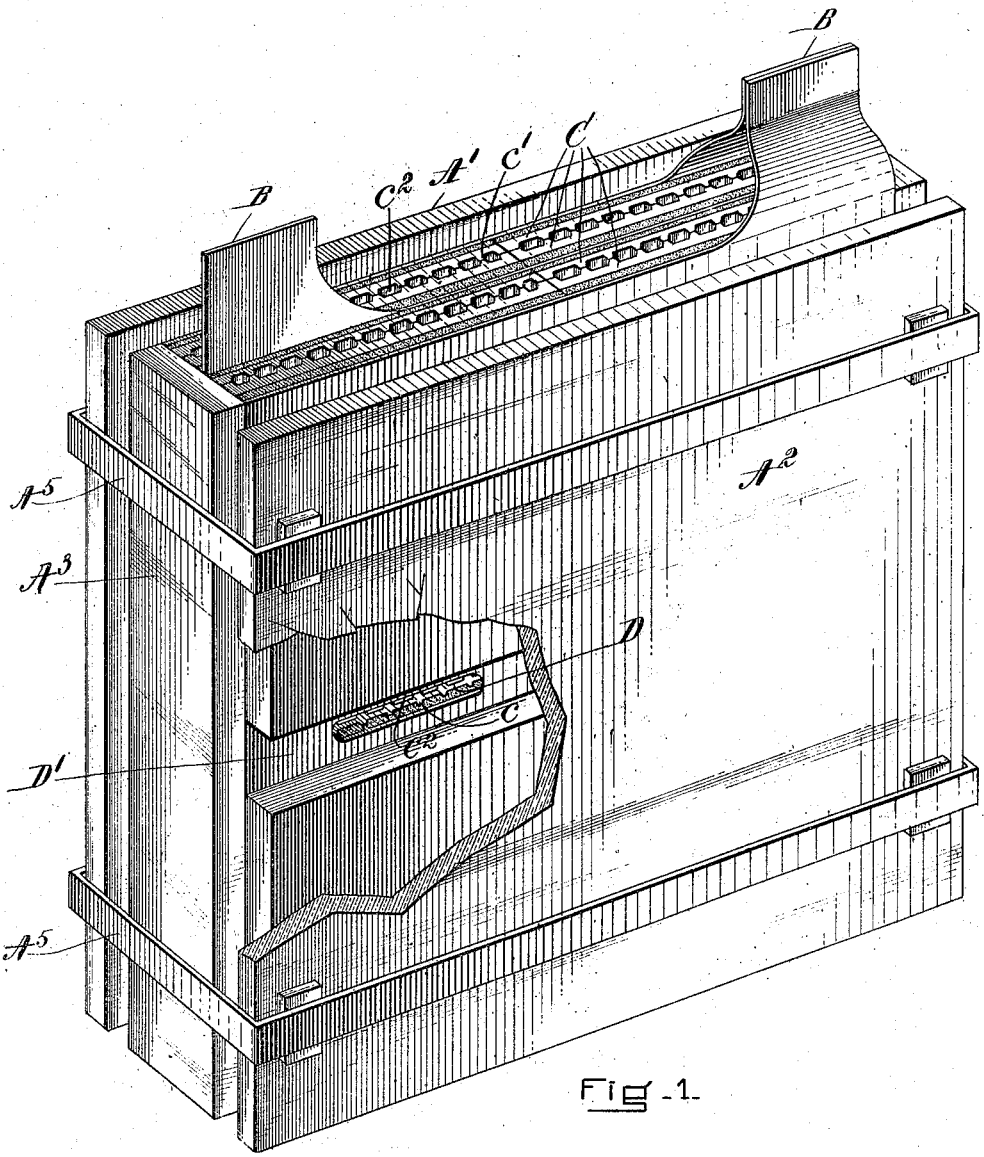

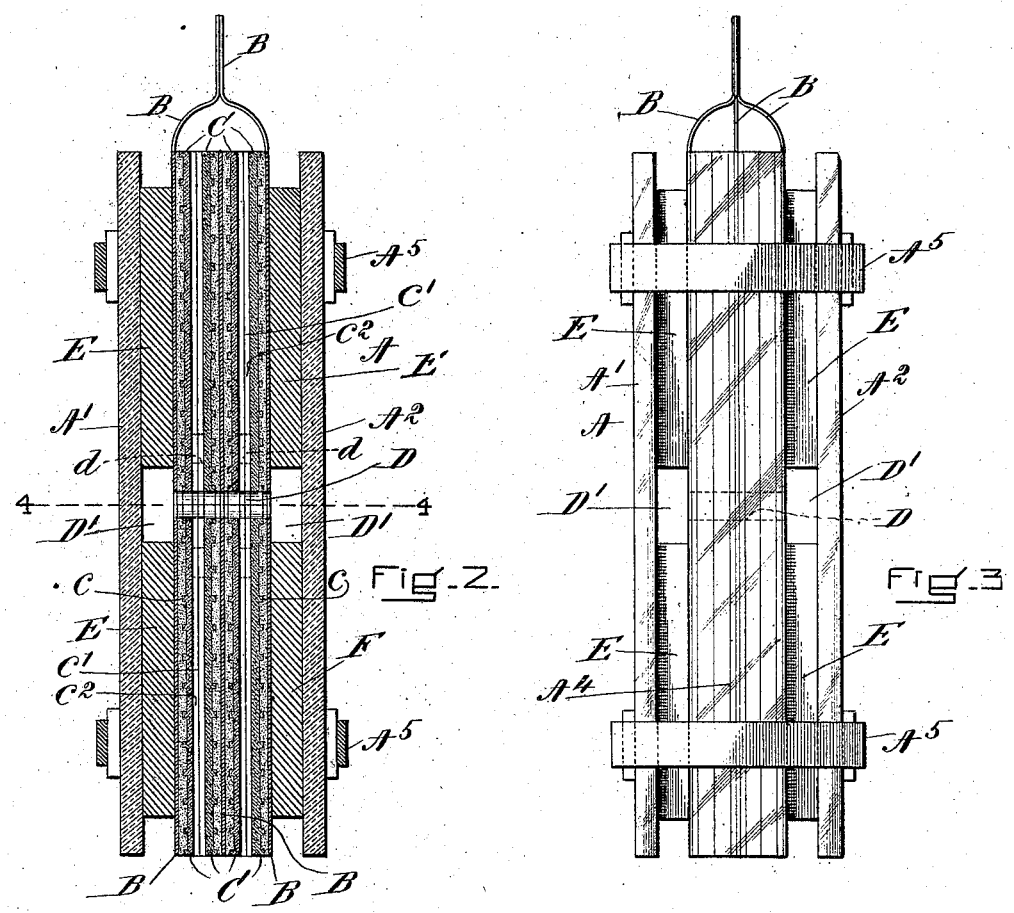
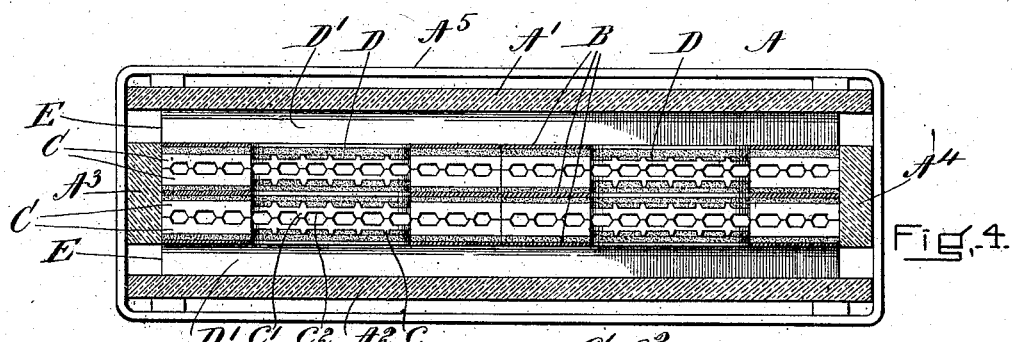
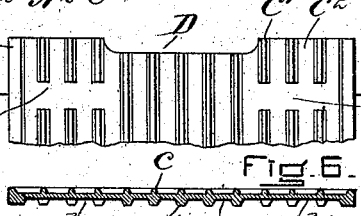
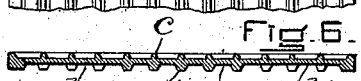

UNITED STATES PATENT OFFICE.

CHARLES H. CLARE, OF STRATHAM, NEW HAMPSHIRE.

SECONDARY OR STORAGE BATTERY.

No. 894,602.

Specification of Letters Patent.

Patented July 28, 1908.

Application filed September 28, 1907. Serial No. 395,010.

*To all whom it may concern:*

Be it known that I, CHARLES H. CLARE, of Stratham, in the county of Rockingham and State of New Hampshire, a citizen of the United States, have invented a new and useful Improvement in Secondary or Storage Batteries, of which the following is a full, clear, and exact description, reference being had to the accompanying drawings, forming a part of this specification, in explaining its nature.

My invention relates to an improvement in secondary or storage batteries having an element or unit comprising a number of independent porous plates carrying or holding in place alongside the electrodes an active material, and between which plates an exciting fluid or electrolyte is admitted to be contained, whereby it or certain chemical elements thereof may be extracted to pass through said porous plates in the operation of the element. In the construction of a battery of this type the custom has been to provide for the admission of electrolyte between the plates of the element by means of ribs on the plates forming channels between them into which the electrolyte is admitted by the ends of the channels opening into the receptacle or cell containing the exciting liquor or electrolyte. Such a construction may be seen in Patent No. 717,351, granted to me December 30, 1902, for an improvement in secondary batteries. This type of battery though very effective is inefficient in that the electro-motive force generated by the element does not have the regularity it should have and as might be obtained in an element of the highest efficiency. In other words, if a line were to represent the electro-motive force of this element during a predetermined interval of time this line would not be a line marking an even gradual decrease in the strength of the element, but a broken one marking an uneven gradual weakening thereof. I have found that the reason for this uneven discharge of the element resides in the fact that the electrolyte on the discharge of the battery becomes weakened in the immediate vicinity of the plates by the extraction of chemicals from the electrolyte causing the efficiency of the liquid to become relatively lowered and as the efficiency of the liquid decreases the electro-motive force and conductivity likewise decrease. The relative lowering of the electrolyte in the vicinity of the plates is only a momentary one and becomes obviated as soon as the equilibrium in the entire body of the electrolyte can be restored.

It is accordingly the object of my invention to so provide that there shall be no momentary relative lowering of the electrolyte in the vicinity of the plates of the element of the battery during the discharge thereof, but that the decrease in the efficiency of the electrolyte shall be uniform throughout its entire body.

The means I have provided can best be seen and understood by reference to the drawings, in which—

Figure 1 shows in perspective my invention applied to a style of element or unit of a battery like that appearing in my said patent, and to which construction of element my invention is especially applicable. Moreover with this especial style of element it may be noted that the decrease in the efficiency of the electrolyte is greater at the center of the element, thereby causing a relative weakness of electro-motive force in that part of the element. Fig. 2 is a vertical section of the element. Fig. 3 shows the element in end elevation. Fig. 4 is a cross section thereof. Figs. 5 and 6 show details of construction to which reference will hereinafter be made.

In the drawings:—A is the element represented as having the insulating side and end plates $A^1$, $A^2$; $A^3$, $A^4$, respectively, bound by suitable binders $A^5$. Within the inclosure formed by these plates and retained thereby are the electrodes B interposed between which are porous plates C. These porous plates C on one side or face thereof are crossed by ridges $c$ forming an irregular or cellular surface containing and supporting an active material, and the plates are so arranged that the side or face of each of the several porous plates bearing this material shall be in contact with the electrodes. On the other side of the porous plates are formed ribs or ridges $c^1$ which provide not only an abutment for adjacent porous plates placed back to back, but form also channels $c^2$ into which the electrolyte or exciting fluid has access as will hereinafter be explained.

With reference now to the means for admitting the electrolyte to the channels formed between the respective porous plates: Extending transversely through the respective electrodes and plates of the element and connecting with the interposed channels are shown ducts D. These ducts may be of any form or order of arrangement. I prefer, however, as shown that they be made at the jointure between the sections which when combined form a complete porous plate of the element, each section at the end having an incision which when the two sections are combined forms a complete duct. The arrangement of ducts D may not be such that they will open directly into all of the channels $c^2$ formed between the various plates, so in order that the electrolyte may have access from the ducts D to each one of the channels $c^2$ between the respective porous plates of the element the ribs or ridges forming these channels, to which the ducts do not have immediate access, are cut away in part forming auxiliary ducts $d$ and affording communication for the flow of the electrolyte or exciting fluid between these channels. The ducts D open to the insulating and retaining plates $A^1$, $A^2$ at the respective sides of the element. In order that these plates may not close the ends of the ducts or may be held clear therefrom, the plates are separated from the electrodes by means of interposed members E of wood or other suitable material made acid-proof if need be and acting as space blocks. These interposed spacing members or blocks E are separate from one another so that the ducts D may be continued between the space blocks to the exterior of the element by channels $D^1$ formed between the blocks and the side plate $A^1$ or $A^2$ and the electrode adjacent to it. The channels $D^1$ open into the receptacle or vessel in which the element is contained, for it is to be noted that the insulating and retaining plates $A^3$, $A^4$ at the ends of the element, while acting as a means of retention and support, are not extended so far as to cover the openings in the channels made by the interposed blocks E. Accordingly the electrolyte entering through the channels $D^1$ into the ducts D has a very ready and free access to the channels formed between the respective porous plates, thereby permitting such freedom of circulation in the electrolyte through the element of the battery that during the discharge thereof the efficiency of the liquid does not become relatively lowered in the vicinity of the porous plates and particularly at the center of the element, but maintains a nearly uniform though gradually decreasing density throughout its entire body with the effect that during the discharge of the battery the electro-motive force drops uniformly as the strength of the element decreases.

Having thus fully described my invention, I claim and desire to secure by Letters Patent of the United States:—

1. In a battery, an element having an assemblage of electrodes, active material and plates for supporting the active material with openings adjacent to said plates for receiving and holding an exciting fluid, said plates and electrodes having formed therein to extend transversely through the same ducts in communication with the exterior of the element for directing the exciting fluid received from outside the element to the openings adjacent to said plates.

2. In a battery, an element bound by outer side and end retaining insulating members between which are contained electrodes, and porous plates adjacent to one another with openings between them for holding and receiving an exciting fluid, said plates and electrodes being formed also to provide ducts communicating with the exterior of the element and passing transversely through the same to communicate with the openings between said porous plates in the interior of the element for directing thereto the exciting fluid received from outside said element.

3. In a battery, an element having outer retaining and insulating members between which are contained electrodes and adjacent thereto porous plates closely adjacent to one another and having openings between them for receiving and holding an exciting fluid, means for separating said retaining members from the outer electrodes to form channels communicating with the outside of said element for receiving an exciting fluid, and which plates and electrodes are formed also to provide ducts in communication with said channels and passing transversely through said plates and electrodes to communicate with the openings between said porous plates in the interior of the element for directing thereto the exciting fluid received from outside the element by the way of said channels.

CHARLES H. CLARE.

In the presence of—
WENDELL P. CLARE,
FRED S. FELLOWES.